(12) United States Patent
Li et al.

(10) Patent No.: US 9,870,401 B2
(45) Date of Patent: Jan. 16, 2018

(54) DATABASE SYSTEM WITH HIGHLY DENORMALIZED DATABASE STRUCTURE

(71) Applicant: Wisconsin Alumni Research Foundation, Madison, WI (US)

(72) Inventors: Yinan Li, Madison, WI (US); Jignesh M. Patel, Madison, WI (US)

(73) Assignee: Wisoncsin Alumni Research Foundation, Madison, WI (US)

( * ) Notice: Subject to any disclaimer, the term of this patent is extended or adjusted under 35 U.S.C. 154(b) by 783 days.

(21) Appl. No.: 14/255,140

(22) Filed: Apr. 17, 2014

(65) Prior Publication Data
US 2015/0302058 A1    Oct. 22, 2015

(51) Int. Cl.
G06F 7/00      (2006.01)
G06F 17/30     (2006.01)

(52) U.S. Cl.
CPC .. G06F 17/30498 (2013.01); G06F 17/30595 (2013.01)

(58) Field of Classification Search
CPC ............... G06F 17/30498; G06F 17/30595
USPC ......................................................... 707/714
See application file for complete search history.

(56) References Cited

U.S. PATENT DOCUMENTS

| | | | | |
|---|---|---|---|---|
| 6,226,710 B1* | 5/2001 | Melchior | .......... | G06F 17/30982 707/999.003 |
| 8,086,598 B1* | 12/2011 | Lamb | ................ | G06F 17/30466 707/606 |
| 8,751,460 B1* | 6/2014 | Annapragada | .... | G06F 17/30545 707/684 |
| 2008/0320277 A1* | 12/2008 | Fish, III | .............. | G06F 9/30032 712/28 |
| 2010/0088309 A1* | 4/2010 | Petculescu | .......... | G06F 17/3048 707/714 |
| 2013/0110881 A1* | 5/2013 | Bender | ............. | G06F 17/30592 707/792 |

OTHER PUBLICATIONS

G. Lawrence Sanders et al.; Denormalization Effects on Performance of RDBMS: 34th Hawaii International Conference on System Sciences; Sep. 2001; pp. 1-9; US.

* cited by examiner

*Primary Examiner* — Kris Mackes
*Assistant Examiner* — Lin Lin Htay
(74) *Attorney, Agent, or Firm* — Boyle Fredrickson, S.C.

(57) ABSTRACT

A database system converts a multi-table relational database into a wide table incorporating all of the information of the relational database tables and converts queries for the relational database system into a form applicable to the wide table. Dictionary compression and/or columnar store allow faster query processing despite a substantially larger size of the wide table.

17 Claims, 4 Drawing Sheets

DATABASE SYSTEM WITH HIGHLY DENORMALIZED DATABASE STRUCTURE

This invention was made with government support under 0963993 and 1250886 awarded by the National Science Foundation. The government has certain rights in the invention.

STATEMENT REGARDING FEDERALLY SPONSORED RESEARCH OR DEVELOPMENT

--

CROSS REFERENCE TO RELATED APPLICATION

--

BACKGROUND OF THE INVENTION

The present invention relates to computerized database systems and in particular to a system that denormalizes relational data tables for faster query processing.

Database systems combine computer hardware and software to efficiently manage access to large amounts of data held in a database structure. An example database structure may hold one or more logical tables (relations) each with data elements organized in logical rows and columns. The columns normally define a common category (type or attribute) of data of the data elements and the rows (tuples) link related data elements of different types.

For example, a database of customers might have multiple rows each associated with a different customer and multiple columns holding different types of information about the customers such as: customer name, customer gender, customer address and the like.

Access to a database structure is commonly done by means of one or more "queries", which may define a query condition (for example, as in an SQL WHERE clause). The query operates on multiple data elements of one or more columns across multiple database rows in a "scan" to identify the data elements relevant to the query. The application of the query to the data elements is termed a "scan" and provides a query result identifying data elements (for example, customer names) of selected rows meeting the query conditions. In the above example, a query might seek to identify the customer names of all customers having a particular gender and would return a query result listing individual customer names for particular rows.

Complex databases often use a relational database structure which relates data elements among multiple tables and linked by keys. This division reduces the amount of data that needs to be stored in a given table by moving some data repeatedly referenced by table rows to a second table. For example, in the above customer database, information about products purchased by the customer, for example, the country of origin or the price, may be stored in a separate table to be referenced when different customers purchase the same product. In this way the customer database table does not need to repeat detailed information about each product. Relational database structures, by substantially decreasing the amount of data that must be stored, can increase the speed of a query scan by reducing the amount of data that must be reviewed in the scan.

It is generally known that considerable speed gains in database scanning can be obtained by placing the database structure entirely or in part within high-speed random access memory. Relational database systems, by reducing the total amount of stored data, can make such "main memory" scans possible.

SUMMARY OF THE INVENTION

The present invention provides a query engine for a database that accelerates queries by denormalizing multiple tables of a relational database into one or a limited number of "wide row" tables using an outer join function. Such denormalization substantially increases the amount of data that must be stored to represent the database and thus might be expected to substantially slow the scan rate of a query both by requiring additional data to be seamed and by preventing the database from fitting entirely into main memory.

Counterintuitively, the present inventors have determined that the advantages of eliminating join operations required to process relational database queries can provide an offsetting speed advantage when proper steps are taken to manage the problems of increased table size. In particular, the present inventors have determined that a wide row table can be practically held in main memory by using techniques such as dictionary encoding and columnar storage. The result is that a wide row table structure can be manageably faster than current relational database structures.

Specifically then, in one embodiment, the present invention provides a database having a data storage device for holding a database having a relational database structure of multiple tables having data elements organized in logical columns related to attributes and logical rows linking the data elements of different attributes, the tables related by key values. A processor in communication with the data storage device executes a stored program to combine the data elements of the multiple tables using an outer join to provide a wide database structure having a wide table being a single logical table of rows and columns. A query for the relational database structure is converted to a wide query and applies the wide query to the wide table to select rows of the wide table according to the wide query using only data contained in the wide table for the selection and the results output.

It is thus a feature of at least one embodiment of the invention to increase the query scan speed of a relational database system by denormalizing it before scanning.

The wide database structure may retain at least one copy of each row of each table of the relational database structure in a row of the wide database structure.

It is thus a feature of at least one embodiment of the invention to provide a joining operation that may preserves all of the data of the relational database tables and thus which may be performed before receipt of a query.

The multiple tables of the relational database system may be related by foreign keys referencing primary keys of other tables and the outer join may split foreign keys of multiple tables of the relational database structure having the same foreign key.

It is thus a feature of at least one embodiment of the invention to provide a simple method of comprehensively combining multiple tables in a join operation.

When the multiple tables are related by primary keys referencing foreign keys, the outer join may eliminate the foreign keys.

It is thus a feature of at least one embodiment of the invention to remove the data elements required only for multiple table structures and thus not necessary in a single table structure.

The wide query may be processed without join operations.

It is thus a feature of at least one embodiment of the invention to accelerate query scans by eliminating time-consuming, post-query join operations.

Compressing the size of the data elements in the wide table uses a dictionary structure linking a data element to a compressed representation and storing the compressed representation in the wide table.

It is thus a feature of at least one embodiment of the invention to mitigate the expanded size of the wide table to allow it to fit within the same or similar memory footprint occupied by the relational database structure. High degrees of dictionary compression are possible because of the typically limited range of the added redundant data of the wide table.

The wide table may be stored using a columnar store format and the wide query may process only to selected columns of the wide database structure referenced by the wide query.

It is thus a feature of at least one embodiment of the invention to further minimize the data that needs to be accessed and stored in main memory for the query scan, speeding the query both by reducing the amount of data to be scanned and by containing the data to be scanned in high-speed memory.

The database may combine the data elements of the multiple tables to also provide at least one subset wide table having fewer columns than the wide table and may test the query to select the subset wide table for at least some queries.

It is thus a feature of at least one embodiment of the invention to permit "child table queries" in which the query does not include the root node of the schema of the wide table.

The query may be tested to see if it can be answered with the wide table and if not, the query may be applied to the relational database structure for at least some queries.

It is thus a feature of at least one embodiment of the invention to permit the wide table acceleration to be used opportunistically while still ensuring full query coverage.

The query processing may read data from the wide database structure in a packed format for parallel processing.

It is thus a feature of at least one embodiment of the invention to permit increased acceleration by packed code scan techniques.

These particular objects and advantages may apply to only some embodiments falling within the claims and thus do not define the scope of the invention.

DETAILED DESCRIPTION OF THE PREFERRED EMBODIMENT

Figure 1:
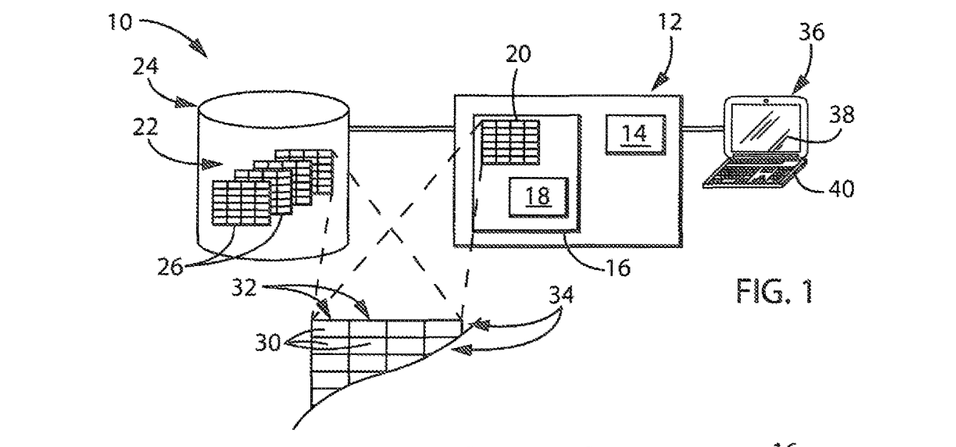
FIG. 1 is a block diagram of principal components of the database system including main and auxiliary memory holding data structures of a relational database and a wide table used in the present invention and holding a program executable by electronic computer to implement the present invention.

Referring now to FIG. 1, the present invention operates in the context of a database system 10 for example, providing for a computer system 12 having one or more processors 14 communicating with a main memory 16. The main memory 16 may comprise solid-state memory elements including, for example, static or dynamic random access memory, flash memory or the like. It will be appreciated that main memory 16 may be comprised of various different types of memory structures that may work together as a logical whole.

The main memory 16 may hold a program 18 implementing features of the present invention and a wide database structure 20, both as will be discussed below. The wide database structure 20 generally reflects a conversion of a relational database structure 22, for example, which may be held in memory 16 or in a separate database storage device 24 such as a disk drive array or the like. The memory 16 and database storage device 24 may represent a typical memory hierarchy where the memory 16 has faster data access but relatively less capacity than the database storage device 24.

Generally the wide database structure 20 will provide one or more single "flat file" tables while relational database structure 22 will be comprised of multiple tables 26 linked together by primary and foreign keys as is understood in the art.

Both the tables of the wide database structure 20 and the relational database structure 22 hold multiple data elements 30 organized in logical columns 32 (fields) each designating an attribute of the data elements 30 and in multiple logical rows 34 (tuples) linking the data elements 30 of different attributes in records. This logical structure is generally independent of the physical storage of the data elements 30.

The database system 10 may communicate, for example, with a user terminal 36 providing a graphic display output 38 and keyboard 40 or other input device to receive queries that will be applied to the database system 10 and to receive the results from those queries.

The present invention will be explained with respect to an example relational database structure 22 providing five tables (Customer. Product, Nation, Region and Buy) as follows:

| Customer | | | | |
|---|---|---|---|---|
| cid | cname | gender | address | nid |
| 1 | Andy | M | 100 | Main St. | 1 |
| 2 | Kate | F | 20 | 10$^{th}$ blvd. | 2 |
| 3 | Bob | M | 300 | 5$^{th}$ Ave. | 1 |

| Product | | | |
|---|---|---|---|
| pid | pname | quantity | nid |
| 1 | Milk | 10.00 | 1 |
| 2 | Coffee | 1.00 | 1 |
| 3 | Tea | 5.00 | 3 |

| Nation | | |
|---|---|---|
| nid | nname | rid |
| 1 | United States | 1 |
| 2 | Canada | 1 |
| 3 | China | 2 |

| Region | |
|---|---|
| rid | rname |
| 1 | America |
| 2 | Asia |

| Buy | | | |
|---|---|---|---|
| cid | pid | amount | status |
| 1 | 2 | 1 | S |
| 2 | 2 | 3 | F |
| 3 | 3 | 2 | S |
| 1 | 2 | 1 | S |
| 2 | 3 | 1 | S |

These tables may be constructed according to the following schema:

Region(rid*, rname)
Nation(nid*, nname, [rid])
Customer(cid*, cname, gender, address, [nid])
Product(pid*, pname, price, [nid])
Buy([cid*, pid*], amount, status)

where rid, nid, cid and pid are table keys and are appended with an * for primary keys and in brackets for foreign keys in the schema shown above.

As ill be appreciated, that these tables may implement a system that can track customer purchases and can indicate the country and region of one or both of the customer and the product. The keys which link the tables of the relational database structure allow region and country information to be shared efficiently to designate either customers or products without duplication in each of the tables of Customer and Product.

Figure 2:
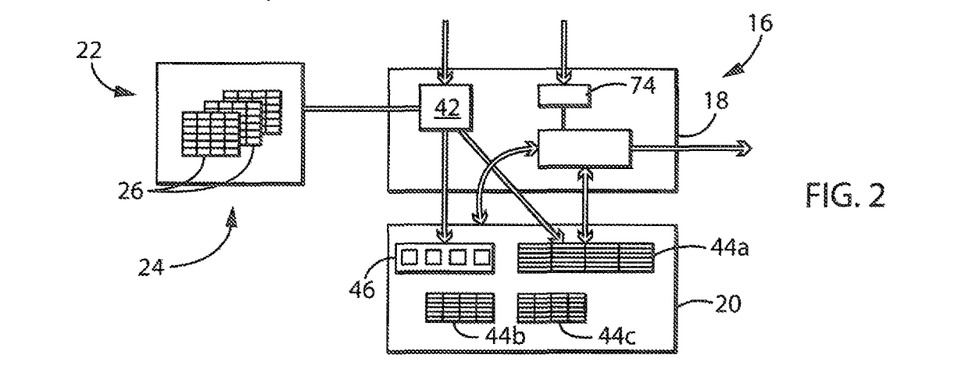
FIG. 2 is a block diagram of components implemented by the program of the present invention.
Figure 3:
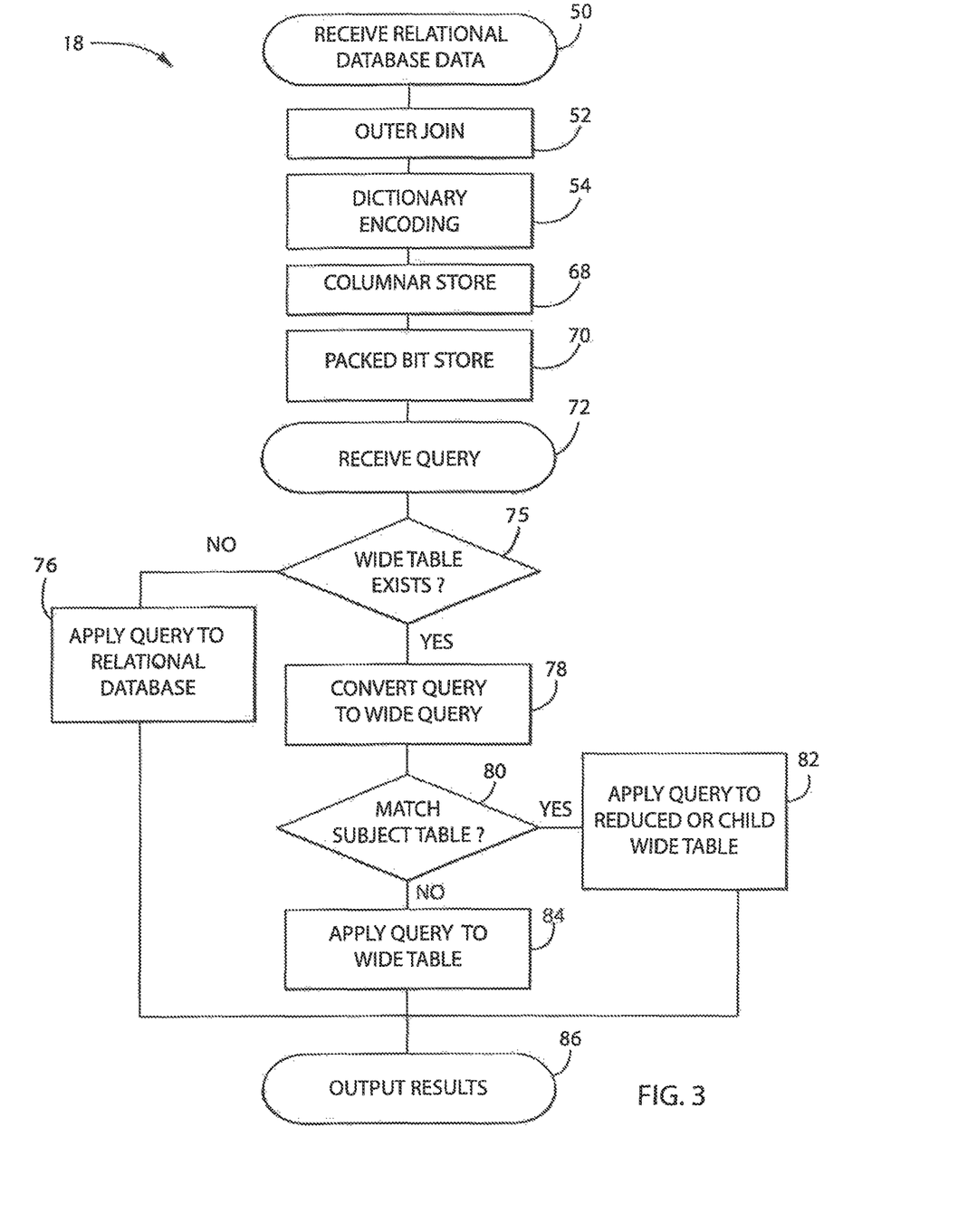
FIG. 3 is a flowchart of the program of the present invention in creating a wide table data structure and scanning the same.

Referring now to FIGS. 2 and 3, the program 18 may implement a denormalizer 42 that may receive the relational database structure 22 and convert it to the wide database structure 20. The wide database structure 20 may include one or more wide tables 44 and one or more dictionaries 46. Generally the wide tables 44 may include a parent wide table 44a and one or more child tables 44b or reduced tables 44c.

The wide table 44a will essentially collapse each of the tables 26 of the relational database structure 22 into a single flat file representing the outer join of the tables 26. As such, the parent wide table 44a will retain all of the non-key data of the tables 26. More specifically the wide table 44a will have at least one copy of each row of each table 26 in one of its rows and one copy of each column 32 of each of the tables 26 with the exception of foreign keys which are rendered redundant by this denormalization.

Figure 4:
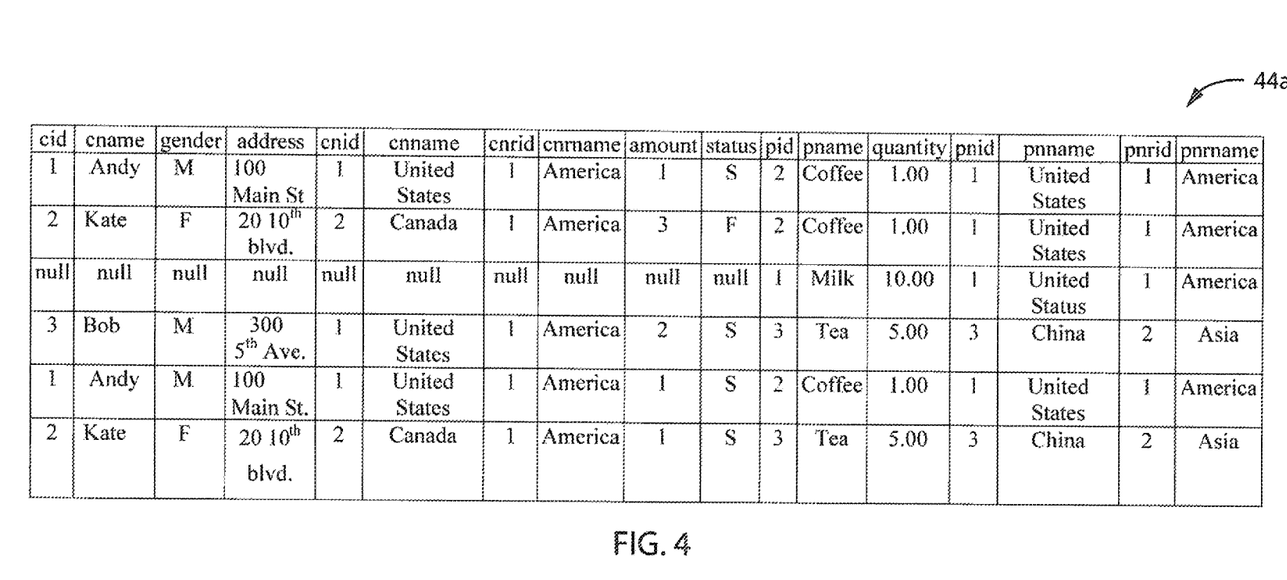
FIG. 4 is an example wide table discussed in an example of the present application.
Figure 5:
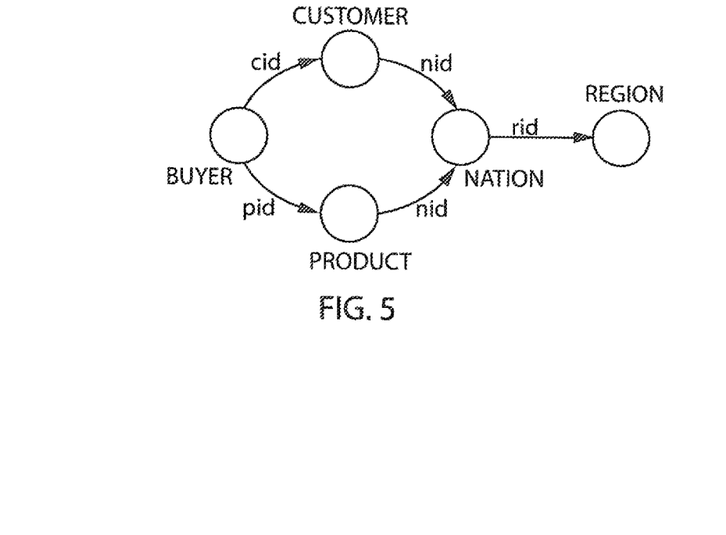
FIG. 5 is a graph of the schema of the example of the present application.
Figure 6:
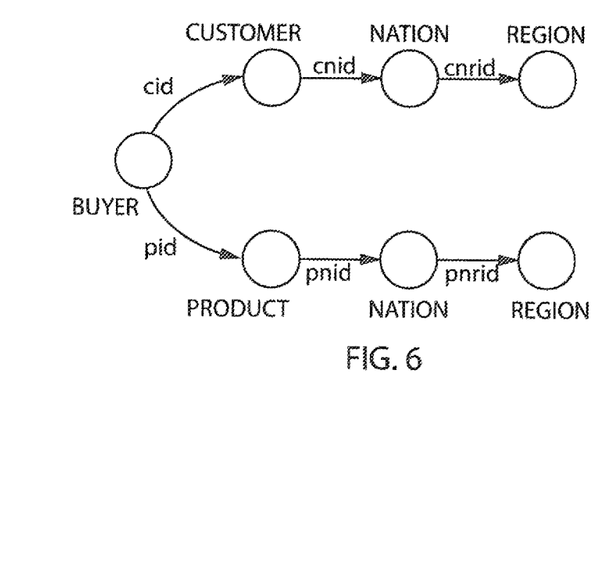
FIG. 6 is a schema tree produced from the graph of FIG. 5.

This process of denormalization essentially reproduces the data of those tables 26 referenced by multiple tables 26 (for example, the Nation and Region tables as shown in FIG. 5) into multiple columns 32 splitting foreign keys as necessary into unique keys to preserve a logical structure (as shown in FIGS. 4 and 6).

As can be seen, all of the data of the tables 26 is contained in this denormalized wide table 44a which provides only a single table structure. Foreign keys such as Customer.nid of the Customer table and Product.nid of the Product table have been split or duplicated into the keys cnid and paid and the same splitting is done with respect to the Region keys of rid to produce the new keys pnrid and cnrid.

Referring to FIG. 2 and describing this process in more detail, this denormalization generates a set of wide tables, called the Set of Materialized Wide tables (SMW), which includes the wide tables 44a that are automatically produced by the denormalizer 42 based on the database schema, as well as wide tables 44b and 44c that are explicitly requested by the users to enhance the performance of certain classes of queries.

The wide table denormalizer 42 converts the input database schema into a directed acyclic graph (DAG), called schema graph, with a vertex for each table and a directed edge from the vertex u to a vertex v if a foreign key in table u points to a primary key in table v. As an example, FIG. 5 shows the schema graph for the example relational database structure 22. We note that although circular reference of foreign keys is possible in a database schema, it is not common, and it is assumed here that the schema graph is a DAG.

The denormalizer 42 then transforms each component of the schema graph into a hierarchical tree representation, called a schema tree. For each component in the schema graph, the denormalizer 42 continues to split vertices of in degree more than one, until all vertices have at most one incoming edge. To split a vertex v of in degree k (k>1), the denormalizer 42 replaces v by k vertices $v_1 \sim v_k$. The i-th ($1 \leq i \leq k$) incoming edge ($u_i$; v) of v is replaced by an edge ($u_i$; $v_i$). Finally, each outgoing edge (v, w) of v is replaced by k edges ($v_1$;w)~($v_k$;w).

FIG. 6 shows the schema tree for the example schema graph. The Nation and Region vertices in the schema graph are split in turn to produce the schema tree. This process is summarized below:

| Producing a schema tree |
|---|
| Input: C': a component in a schema graph |
| Output: C: the produced schema tree |
| 1: C := C' |
| 2: while there exists a vertex v of in degree k > 1 in C do |
| 3:    Replace vertex v by k vertices $v_1 \sim v_k$ |
| 4:    for i := 1...k do |
| 5:       Replace the incoming edge ($u_i$, v) by an edge ($u_i$, $v_i$) |
| 6:    for each outgoing edge (v, w) in C do |
| 7:       Replace edge (v, w) by k edges ($v_1$, $w_i$) ~ ($v_k$, w) |
| 8: return C; |

In the description below, T(u) denotes the associated table of vertex it in a schema tree. For instance, ifs denotes the source vertex of the example schema tree (FIG. 5), then T(s) represents the Buy table. In addition, for a table R, we use R.p and R.f (S) to denote the primary key and the foreign key, respectively, referencing the table S. The SMW contains the wide tables that are automatically constructed by the denormalizer based on the schema tree(s). To automatically materialize a wide table, the system performs joins on all nodes/tables in the associated schema tree, using a post-order depth-first traversal algorithm. For each node v that is traversed, if there is an incoming edge (u; v) in the schema tree, we perform a join between T(u) and T(v).

Rather than regular joins, the denormalizer 42 actually uses outer joins on each pair of primary and foreign keys to produce the denormalized tables. Formally, for each directed edge (u, v) in the schema tree, the denormalizer 42 performs T(v) (LOJ) T(u), where the operator (LOJ) represents a (left) outer join. With these outer joins, a wide table retains each tuple in the original normalized tables, even if no matching tuple in the other side of the join exists. For instance, even though the product "Milk" is not purchased by any customer, it is included in the BuyWT wide table 44a, and missing attributes are marked as NULLs. These NULL-padded tuples are required to answer queries that contain nested subquery blocks, or to answer queries on the table that has been embedded into a wide table.

For the example database, there is only one connected component in the schema graph, and thus the SMW is the singleton set {BuyWT}, where BuyWT refers to the wide table built on the original Buy table and is the result of the expression (Region (LOJ) Nation (LOJ) Customer) (LOJ) (Region (LOJ) Nation (LOJ) Product (LOJ) Buy). Note that the Nation and Region tables are joined twice to produce this wide table.

Once the denormalization on all the sources is complete, each table 26 in the original relational database structure 22 has been denormalized into at least one wide table 44 since each vertex in the schema graph is either reachable from a source, or is a source itself. The steps of receiving the data and converting it to the use of the outer join are shown generally at process blocks 50 and 52 of FIG. 3.

It will be appreciated that the wide table 42a is substantially larger than the total of the uncombined tables 26 of the relational database structure 22 because of the duplication of data in the denormalization process as exacerbated by the possibly large size of much of the duplicated data. Thus, for example, if the number of data elements 30 is doubled and the particular data elements are large, for example, CHAR (100), the data requirements can increase well beyond what the increased number of redundant data elements 30 would suggest.

This increase in size of the wide tables 44 might be expected to prevent the wide tables 44 from being held and executed in main memory 16 (shown in FIG. 1) substantially slowing the execution of any query by requiring access to slower database storage device 24. To avoid this slowing, per process block 54 of FIG. 3, the data of the wide tables 44 is compressed through dictionary encoding that converts the data elements of the wide table 44a into a compressed thrill using one or more dictionary tables.

For example, dictionaries 46 for the customer name (cname), gender, address, nation name (nname), region name (rname), status, product name (pname) and quantity can be constructed as follows:

| cname dictionary | |
|---|---|
| value | code |
| Andy | 0 |
| Bob | 1 |
| Kate | 2 |

| gender dictionary | |
|---|---|
| value | code |
| F | 0 |
| M | 1 |

| address dictionary | |
|---|---|
| value | code |
| 100-Main-St. | 0 |
| 20-5$^{th}$-Ave. | 1 |
| 300-10$^{th}$-blvd. | 2 |

| nname dictionary | |
|---|---|
| value | code |
| Canada | 0 |
| China | 1 |
| United-States | 2 |

| rname dictionary | |
|---|---|
| value | code |
| America | 0 |
| Asia | 1 |

| status dictionary | |
|---|---|
| value | code |
| F | 0 |
| S | 1 |

| pname dictionary | |
|---|---|
| value | code |
| Coffee | 0 |
| Milk | 1 |
| Tea | 2 |

| quantity dictionary | |
|---|---|
| value | code |
| 1.00 | 0 |
| 5.00 | 1 |
| 10.00 | 2 |

Figure 7:
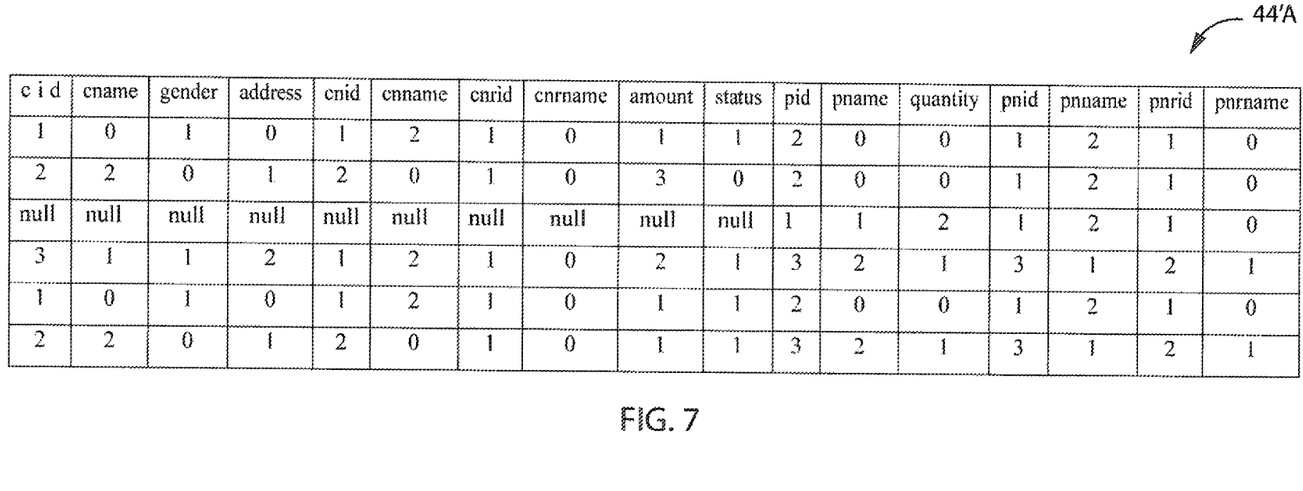
FIG. 7 is an example wide table after compression using dictionary encoding.

When dictionary encoding is applied to the wide table 44a of FIG. 4, the result is the compressed wide table 44a' of FIG. 7 which provides a much reduced total storage space typically comparable to the storage space of the source relational database structure 22.

Wide table 44a does not presuppose a particular type of query that is logically complete to handle any query that could be handled by the relational database structure 22. If the type of queries is known or can be pre-characterized, the user can make an explicit request to create smaller wide tables 44c (discussed below) allowing these queries to run even faster. Note that dictionaries 46 can be shared by all the wide tables 44 on the same columns, thus adding a new wide table 44b or 44c does not necessarily result in creating new dictionaries. For example, a user can explicitly request creating a reduced size wide table 44c on the Customer table in the example database as follows:

| Reduced Wide Table | | | | | | | |
|---|---|---|---|---|---|---|---|
| cid | cname | gender | address | cnid | cnname | cnrid | cnrname |
| 1 | 0 | 1 | 0 | 1 | 2 | 1 | 0 |
| 2 | 2 | 0 | 1 | 2 | 0 | 1 | 0 |
| 3 | 1 | 1 | 2 | 1 | 2 | 1 | 0 |
| 1 | 0 | 1 | 0 | 1 | 2 | 1 | 0 |
| 2 | 2 | 0 | 1 | 2 | 0 | 1 | 0 |

This reduced wide table 44c is constructed by the expression Region(LOJ)Nation1 (LOJ)Customer. With this reduced wide table 44c, the SMW for the example wide database structure 20 includes wide tables BuyWT (FIG. 7) and CustomerWT (shown above), as will be used in the examples below.

Figure 8:
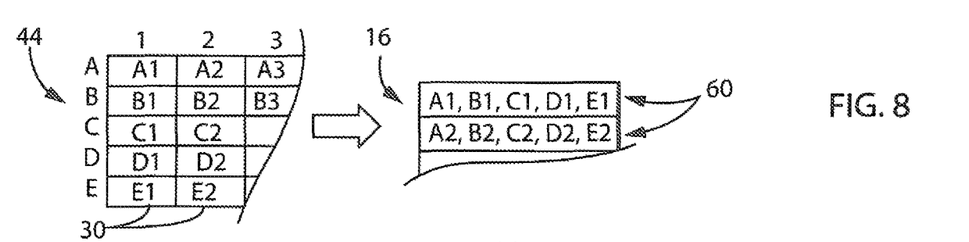
FIG. 8 is a simplified representation of a database table having column encoding.

Referring now to FIG. 8, the data of the wide tables 44 when stored in main memory 16 may be serialized in columnar form. This columnar form does not reduce the amount of storage space required by the wide tables 44, but substantially reduces the access time for the necessary data when a particular query requires only certain columns of the wide table 44.

More specifically, storage of the data elements 30 of the wide table 44a are combined in series for storage in computer memory words 60 that have an implicit address ordering. A typical storage method serializes the data by rows 34, for example, to provide the serialization of A1, A2, A3, etc., where capital letters denote rows 34 and numbers denote columns 32. Obtaining selected columns of data from memory 16 in this form requires reading of many columns of data that are not required.

Accordingly the present invention adopts columnar storage in which the serialization is according to the pattern of A1, B1, C1, etc. In this case, selected columns can be obtained by selecting particular memory words 60 individually by address without the need to load data of other columns. Thus for example, if the query required determining those products purchased in a quantity less than $1.50, in the above example, the columns of pname and quantity could be read in isolation from the other columns.

Figure 9:
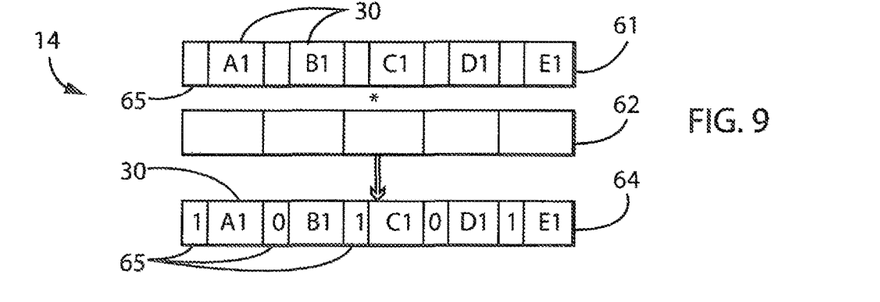
FIG. 9 is a simplified example of a packed bit processing of stored database data.

Referring now to FIG. 9, in addition, the data elements 30 may be stored in a packed structure that allows for effective parallel processing of the data as a single computer word. One example of such parallel processing is described generally in Y. Li and J. M. Patel. BitWeaving: fast scans for main memory data processing, SIGMOD, pages 289-300, 2013. Assuming that the data elements 30 are stored in columnar form as described above, they may be loaded into a processor word 61 (being the size of word that may be executable in one operation by a given processor) so that the data elements 30 of the processor word 61 can be processed with a processing vector 62 in a single computer operation to provide a processed vector 64 holding the original data of processor word 61. The processor word is "packed" to also provide space 65 for process results indicating the results of a query test. In this way, the processor may write a processed vector 64 containing the results of the processing. Other types of packed processing suitable for use with the present invention are described in: J. Zhou and K. A. Ross. Implementing database operations using simd instructions, SIGMOD, pages 145-156, 2002; and R. Johnson, V. Raman, R. Sidle, and G. Swart. Row-wise parallel predicate evaluation. PVLDB, 1(1):622-634, 2008.

These steps of columnar are storage and packed processing shown in FIG. 3 as process blocks 68 and 70.

Referring still to FIGS. 2 and 3, once the wide tables 44 have been created, a query may be received by the program 18 as indicated by process block 72. The query is received by a translator 74 which translates the query intended for the relational database structure 22 to one that would work with the wide database structure 20. Generally this translation eliminates the implicit or actual joins of the query to provide a query that operates at high speed on a single scan through the wide table 44a.

For example, a query may be received intended for the relational database structure 22 as follows:

Q1: SELECT cname
FROM Customer, Buy, Product
WHERE Customer.cid=Buy.cid
AND Buy.pid=Product.pid
AND Customer.nid=Produt.nid It will be appreciated that this query generally selects customers who purchase products that come from the same nation as the nation of the customer. The present invention can simplify this query which requires two implicit joins (the Customer table joined to the Buy table in turn joined to the Product table) to a simplified query as follows:

Q1: SELECT cname
FROM Wide Table
WHERE cnid=pnid

While this query is visibly shorter, it will also be understood that it is substantially faster being implemented with a single scan with no joins. In addition it requires analysis of only three columns of the wide table 44 (cname, cnid and pnid) greatly reducing the amount of data that must be scanned. Thus the substantial increase in the size of the wide table 44 is offset by this substantial improvement in scan speed and compactness.

Specifically, a query may be modified according to the following methodology. First, the translator 74 evaluates the query directed toward the relational database structure 22 by translating it into a relational algebraic (RA) expression on an appropriate wide table in the SMW.

The operators of the relational algebra include the selection ($\sigma$), the projection ($\pi$), the set union (U), the set difference (−), the natural join (NJ), the semi join (SJ) the outer join (OJ), and the aggregation ($\gamma$).

Single Block Queries

A single block (i.e. with no nested subquery blocks) query is often expressed as a Selection-Join-Aggregation (SJA) query. A representative SJA query performs scans, followed by joins on multiple tables, followed by a group operation, and finally some aggregate operations. The translator 74 supports three variants of joins: regular (inner) joins (IJ), semi joins (SJ), and outer joins (OJ). Semi joins and outer joins are not common in single block queries, but may arise when a wide table flattens nested queries.

The translator 74 first converts the input SQL query to an RA expression on the original relational database structure 22 using traditional methods such as those discussed in P. G. Selinger, M. M. Astrahan, D. D. Chamberlin, R. A. Lorie, and T. G. Price Access path selection in a relational database management system, SIGMOD, pages 23-34, 1979, as are known in the art. This RA expression is then transformed to an equivalent RA expression on a wide table using Algorithm 2 below.

---
Algorithm 2
Translating an RA expression for single block queries
---

Input: q': a relational algebra (RA) expression
Output: q: an equivalent RA expression on a wide table
1: q := q'
2: Construct query graph G for q
3: if G is not connected then
4: return NULL
5: Replace all semi joins R(SJ)S by $\pi_{R.*}$(R(NJ)S) in q
6: Replace all inner joins R(NJ)S by $\sigma_{S.p \neq NULL}$(R(OJ)S) in q
7: Select the smallest wide table W that covers G
8: Replace outer joins by W in q
9: Remove unnecessary selection conditions in q
10: return q.

---

We define a condition of the form R.f (S)=S.p in the RA expression of a query to be a Foreign Key Join (FKJ) condition if the attribute R.f (S) is a foreign key that references the primary key attribute S.p of table S. Note that FKJ conditions can explicitly appear in selection or join conductions, or be implicitly derived by the common attribute names in natural joins.

Given an RA expression q, we convert q into a graph, called the query graph, with a vertex for each table variable appearing in the query and an edge from vertex u to vertex v if there is an FKJ condition between the foreign key table T(u) and the primary key table T(v). If a table is involved with k variables in the query, we add k vertices associated with this table in the query graph.

If two directed edges (u1, v) and (u2, v) enter the same vertex v in the query graph, then there must exist two FKJ conditions $T(u_1).f(T(v))=T(v).p$ and $T(u_2):f(T(v))=T(v).p$. In this case, we arbitrarily replace one of the two HU conditions by a non-FKJ condition $T(u_1).f(T(v))=T(u_2).f(T(v))$, and remove the corresponding edge in the query graph. This step does not change the semantics of the query, but reduces the in degree of the vertex that has more than one incoming edge. By successively applying this step, we guarantee that each vertex in the query graph has at most one incoming edge.

The query can be evaluated with the wide tables in the SMW if and only if the query graph is connected if the query graph is disconnected, then certain join components have not been materialized in any wide tables in the SMW, and that query must be sent to the relational database structure 22 for evaluation.

The algorithm for transforming q into an equivalent RA expression on a wide table is as follows:

First, we replace semi joins (SJ) and regular joins (NJ) in q by outer joins (OJ) with a sequence of equivalent transformations. For each semi join R(SJ)S in q, we replace it by $\pi_{R.*}$(R(NJ)S), applying the relational equivalence equation 0 shown below. (Note R.* denotes all the attributes in R.) This step essentially adds a projection operator for each semi join operator to eliminate duplicate values. For each regular join R(NJ)S in q, we replace it by $\sigma_{S.p \neq NULL}$(R(OJ)S) applying the relational equivalence of equation-1 below. The selection operator that is introduced filters out tuples that occur because of the outer joins, e.g. the "milk" row in the example denormalized table (FIG. 4).

$$R(SJ)S = \pi_{R.*}(R(NJ)S) \qquad (\text{eq. 1})$$

$$R(NJ)S = \sigma_{S.p \neq NULL}(R(OJ)S) \qquad (\text{eq. 2})$$

Next, we pick the smallest (in term of cardinality) wide table 44 in the SMW that "covers" the query. A query is "covered" by a wide table 44 if and only if its query graph is a subgraph of the associated schema tree of this wide table. Given the selected wide table 44, we push all outer joins ahead of all selections and projections as we can commute an outer join with a selection or a projection. Then, we replace the permutation of all outer joins in q by the selected wide table 44. (For simplicity here, we assume that the source of the selected schema tree is included in the query graph.)

Finally, we optimize the transformed RA expression q by removing unnecessary selection conditions. A selection condition in the form of R.p≠NULL, can be removed from q, if (1) there exists another selection condition involving the table R, unless the latter condition is of the form R.a=NULL; or (2) there exists a selection condition of the form T(u).p≠NULL for each child vertex u of R's associated vertex in the query graph.

If all joins in q are regular (inner) joins, then the algorithm to remove unnecessary selection conditions can be simplified as follows: for the source s in the query graph, ifs is not the lowest common ancestor of all vertices whose associated tables are involved in non-FKJ predicates, then we keep a condition of the form T(s).p≠NULL; all other conditions of the form R.p≠NULL are removed from q.

Example 1

Consider the query Q2 below. The RA expression for this query is shown as q'2.
Q2: SELECT DISTINCT ename
FROM Customer C, Buy B, Product P, Nation N1, Nation N2, Region R
WHERE C.cid=B.cid AND B.pid=P.pid
AND C.nid=N1.nid
AND N1.rid=R.rid
AND P.nid=N2.nid
AND N2.rid=R.rid
AND N1.nname≠N2.nname
AND C.gender='M' AND R.rname='America'

$$q'2:\pi_{ename}(\sigma_{N1.nname \neq N2.nname}((\sigma_{rname='America'}(R)(NJ) \\ N1(NJ)\sigma_{gender='M'}(C(NJ)B)(NJ) \\ B_{pid=P.pid'N2.rid=R.rid}(P(NJ)N2))) \qquad (\text{eq. 3})$$

Figure 10:
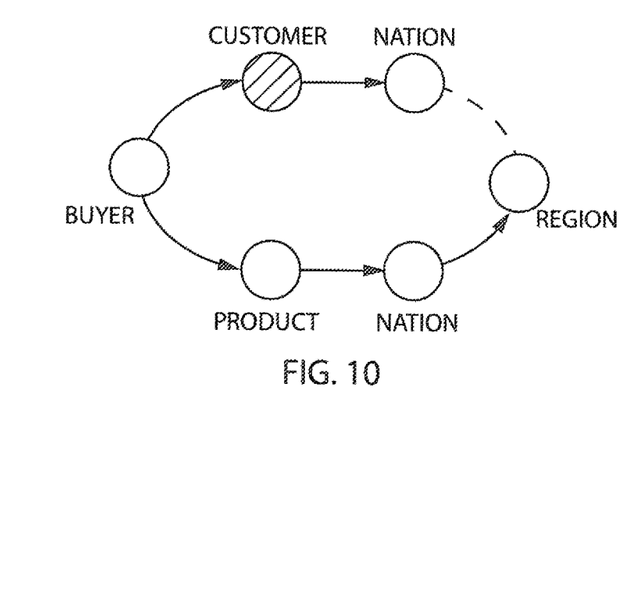
FIG. 10 is a graph of a schema of a single block query use in an example discussed in the present application.
Figure 11:
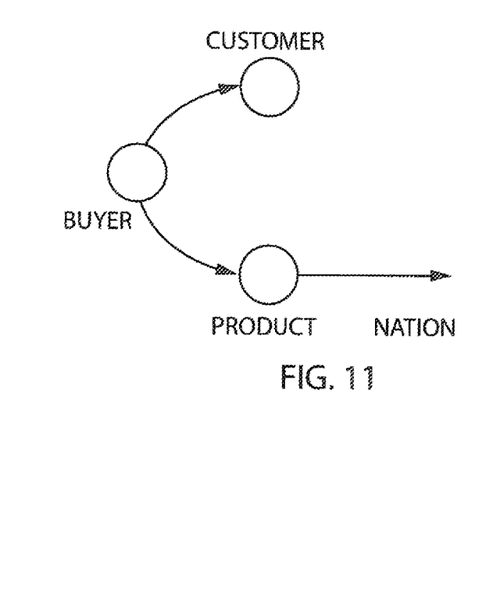
FIG. 11 is a graph of the schema of a nested query also used in an example discussed in the present application.

The query graph for Q2 is shown in FIG. 10. The table variables involved in non-FKJ predicates are cross-hatched. The edge from the N1 vertex to the Region vertex (marked as a dashed arc) is removed as there is another edge entering the Region vertex, and a new condition cnrid=pnrid is therefore added. To run Q2 on the example database, we select the BuyWT wide table, since the schema tree of CustomerWT wide table does not cover the query graph of Q2. The regular conditions, Customer.gender='M' and cnrname='America', as well as the join condition N1.nname≠N2.nname, are non-FKJ conditions and are therefore added into the selection operator in q2 (with modified attribute names). Since all vertices, whose associated tables are involved in these non-FKJ conditions (marked gray in FIG. 10), are only reachable from the source, we do not need to add the conditions cid≠NULL and pid≠NULL. The final transformed RA expression is shown as q2.

$$q2:\pi_{cname} \\ (\sigma_{cnrid=pnrid \text{ } cnname \neq pnname \text{ } gender='M' \text{ } cnrname='America'} \\ (BuyWT)) \qquad (\text{eq. 4})$$

Nested Queries

Nested queries are fairly common in analytical data warehousing environments, and often contain keywords such as IN EXISTS, or set-comparison operators. Nested queries are generally flattened using techniques such as described in: U. Dayal, Of nests and trees: A unified approach to processing queries that contain nested subqueries, aggregates, and quantifiers, VLDB, pages 197-208, 1987; or R. A. Ganski and H. K. T. Wong. Optimization of nested sql queries revisited, SIGMOD, pages 23-33, 1987; or P. Seshadri, H. Pirahesh, and T. Y. C. Leung. Complex query decorrelation, ICDE, pages 450-458, 1996.

Amongst these techniques, Dayal's methods are well-suited for wide table 44 as they use generalized outer joins. In order to rewrite a nested query for wide tables, the translator 74 first flattens the query with Dayal's methods, producing a set of equivalent RA expressions for the nested query. In the interest of space, we omit restating Dayal's methods here, as we use it exactly as was proposed to transform/flatten queries. Then, the translator 74 enumerates all the produced (flattened) RA expressions, and finds the one that can be transformed to an equivalent RA expression on an appropriate wide table 44. If such an (RA) expression does not exist, then the query must be sent to the relational database structure 22. With Dayal's method, the nested predicates and correlation predicates in the original query are removed and translated to three variants of joins: semi joins (SJ), outer joins (OJ), and regular (inner) joins (NJ). Consequently, the translator 74 can use the method for single block queries discussed above to translate each RA expression that is produced after applying Dayal's methods. However, before we feed each of the produced RA expressions q into the method for single block queries, we need to push all join operations ahead of all aggregation operations. To move an aggregation operation ($\gamma$) ahead of a regular join or an outer join operation, we add to the grouping attributes all of the attributes of the table being joined to, as shown in the relational equivalence E3. In practice, only the primary key and the attributes that are referenced in the subsequent operators need to be added into the grouping attributes of the aggregation operation. Semi joins are firstly converted to regular joins by using relational equivalence equation 1 above.

$$R \circ \gamma \ldots (S) \equiv \gamma \ldots, s.*(R \circ S), \text{ if o is FKJ, and o is an element of } \{(OJ),(NJ)\} \quad \text{(eq. 5)}$$

Example 2

As an example of this approach, consider query Q3 below. This query finds the names of the nations that produce products, except for coffee, that are available in quantities that are greater than the number of male customers who have successfully purchased this product. This query has two levels of nested subqueries: the first subquery is nested under the IN keyword, and the second subquery is nested under the arithmetic operator<.

Q3: SELECT DISTINCT Nation.nname
FROM Nation N
WHERE N.nid IN (
  SELECT P.nid FROM Product P
  WHERE P.name≠'Coffee'
  AND P.quantity > (
    SELECT COUNT(DISTINCT cid)
    FROM Buy B, Customer C
    WHERE B.pid = P.pid AND B.cid = C.cid AND B.status = 'S'
AND C.gender = 'M'))

Applying Dayal's methods on Q3 produces q'3 and a set of other RA expressions. The translator 74 first pushes the semi join in q'3 ahead of the aggregation, transforming q'3 to q"3. Then, we use the method for single block queries to translate q"3. The query graph of q"3 is a subgraph of the associated schema tree of BuyWT. Thus, we select BuyWT as the base wide table 44 to transform q"3. To convert the two regular joins in q"3 to outer joins, we add two new selection conditions pid≠NULL and cid≠NULL. The latter is then removed because there exists a condition (gender='M') on the Customer table. After walking through all the steps to rewrite q"3, the transformed RA expression is shown as q3.

$$q'3{:}\pi_{nname}(N(SJ)\sigma_{quantity>Count}(\gamma_{pid;quantity;Count(cid)} \\ (\sigma_{pname\neq'Coffee'}(P)(OJ)\sigma_{status='S'}(B)(NJ) \\ \sigma_{gender='M'}(C)))) \quad \text{(eq. 6)}$$

$$q'3{:}\pi_{nname}(\sigma_{quantity>Count}(\gamma_{pid;quantity;nname;Count(cid)}(N \\ (NJ)(\sigma_{pname\neq'Coffee'}(P)(OJ)\sigma_{status='S'}(B)(NJ) \\ \sigma_{gender='M'}(C))))) \quad \text{(eq. 7)}$$

$$q3{:}\pi_{pnname}(\sigma_{quantity>Count}(\gamma_{pid;quantity;pnname;Count(cid)} \\ (\sigma_{pname\neq'Coffee' \; 'status='S' \; 'gender='M' \; 'pnid\neq NULL} \\ (BuyWT)))) \quad \text{(eq. 8)}$$

Note that the use of outer joins to produce a wide table is critical in obtaining the correct query results for nested queries. In the case of query Q3, consider the "Milk" tuple in the original Product table. There are zero customers who have purchased this product, which is a smaller number than the available quantity for this product. As a result, the nation name ('United States') for the product Milk should be selected as part of the result. However, this result is missed if the wide table was generated with an inner join operator.

Child Table Queries

If the query graph of a query does not include the root node of the schema tree of the selected wide table, then this query is called a child table query. The key problem with evaluating a child table query on a wide table is that each tuple of the child table may appear more than once in the wide table, which may produce incorrect query results. We fix this problem by adding a projection operator in the RA expression to eliminate duplicate tuples. Translating a child table query follows the method for single table queries with additional handling for the "child table". Given a child table query, we use the method for single block queues to generate an RA expression q. Let q' be a subexpression in q that corresponds to the selection operators on the chosen wide table. Then, we replace q' by $\pi_{T(u).p', \ldots}(q')$ in q, where u denote the source of the query graph of q, and the triple-dot punctuation represents a list of attributes that are referenced in the scope of q, but outside the scope of q'. The correctness of this algorithm can be demonstrated with the relational equivalences (eq. 9) and (eq. 30). Let s be the source of the selected schema tree, and u be the vertex in the schema tree that corresponds to the source of the query graph. Then, we can replace T(u) by $\pi_{T(u)}.*(T(u)(OJ) \ldots (OJ)T(s))$ in q, by continuously applying (eq. 9) and (eq. 10) to include all ancestors of u into q. Thus, we transform the child table query into a regular single block query.

$$R \equiv \pi_{R.}*(R(OJ)S) \quad \text{(eq. 9)}$$

$$\pi_{a1}(R) \equiv \pi_{a1}(\pi_{a1}( \ldots (\pi_{an}(R)))) \quad \text{(eq. 10)}$$

where a1 is $a_1$ and an is $a_n$.

Example 3

The example query Q4 computes the count of products that are available in a quantity greater than 3, for each nation. Notice that of the two wide tables in the SMW (i.e. BuyWT and CustomerWT), only the BuyWT wide table "covers" the query graph of this query, and thus can be used to answer this query. Since the table Buy is not involved in this query, Q4 is treated as a child table query. By applying the method for translating single block queries, Q4 is rewritten as an intermediate RA expression $q'_4$ (note that $q'_4$ is not equivalent to the original query Q4), which is then further transformed to an RA expression $q_4$.

Q4: SELECT N.nname, COUNT(*)
FROM Product P, Nation N
WHERE P.nid=N.nid AND P.quantity>3.00
GROUP BY N.nname $$q'_4 {:} \gamma_{pnname;Count(*)}(\sigma_{quantity>3.00}(\text{Buy}WT)) \quad \text{(eq. 11)}$$

$$q_4 {:} \gamma_{pnname;Count(*)}(\pi_{pid;pnname}(\sigma_{quantity>3.00}(\text{Buy}WT))) \quad \text{(eq. 12)}$$

The use of outer joins is also critical to obtain correct query results for child table queries. The relational equivalence equation 9 does not hold if we replace (OJ) by (NJ). In the case of query Q4, the tuple "Milk" in the original Product table has a value of 10.00 for the attribute quantity, which is greater than the literal (3.00) that is specified in the query. Hence, this tuple should be counted in the result. However, this value would be missed if the underlying wide table were generated with an inner join operator. We note that if the system notices that many child table queries are being issued, then a new wide table corresponding to these child tables can be materialized and added to the Referring again to FIG. 3, after receiving a query intended for the relational database structure 22 at process block 72, the program 18 may determine at decision block 75 whether a wide table 44 has been created that is responsive to this query. This decision block allows selected portions of any given database to be converted to a wide table format. If no wide table exists, the program proceeds to process block 76 and a conventional search of the relational database structure 22 is performed using a relational database engine of the type known in the art.

If a wide table 44 exists as determined at decision block 75, then at process block 78 the query is converted to a wide query and a determination made at process block 80 whether the search relates to a child wide table 44b or reduced wide table 44c. If so, at process block 82, the converted query of process block 78 is applied to wide table 44b or 44c. Otherwise, the program 18 proceeds to process block 84 and the converted query is applied to the wide table 44a. At both process blocks 82 and 84, only the necessary columns may be accessed from memory 16 using the columnar store technique, and packed bit processing of process block 70 may be exploited. At process block 86 the output of the query may be provided to the user, for example, through the terminal 36.

Certain terminology is used herein for purposes of reference only, and thus is not intended to be limiting. For example, terms such as "upper", "lower", "above", and "below" refer to directions in the drawings to which reference is made. Terms such as "front", "back". "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof; and words of similar import. Similarly, the terms "first", "second" and other such numerical terms referring to structures do not imply a sequence or order unless clearly indicated by the context. The terms "vertical" and "horizontal" with respect to data storage refer only to the hardware enforced data access preference, with horizontal data being accessed in a single unit.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It will be appreciated that the present invention may be flexibly implemented in one or more electronic computer processors or cores that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network. The program may be software or firmware, the latter implemented in hardware, for example, in a field programmable gate array or other specialized circuit. Generally the term processor should be considered to broadly embrace electronic computer systems and similar circuits such as gate arrays.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. A database comprising:
  a data storage device for holding a database having a relational database structure of multiple tables having data elements organized in logical columns related to attributes and logical rows linking the data elements of different attributes, the tables related by key values;
  a high speed memory having faster access speed than the data storage device and
  a processor in communication with the data storage device and the high speed memory and executing a stored program held in a non-transitory medium to:
   (a) combine the data elements of the multiple tables using an outer join to provide a wide database structure sized to store in high speed memory and having a wide table being a single logical table of rows and columns;
   (b) store the wide database structure in high speed memory;
   (c) after steps (a)-(b), receive a query for the relational database structure and convert it to a wide query for application to the wide table;

(d) apply the wide query to the wide table as stored in high speed memory to select rows of the wide table according to the wide query using only data contained in the wide table for the selection;

(e) output results from of the wide query applied to the wide database structure based on the selected rows; and f) repeat steps (c)-(d) for the wide database structure of steps (a)-(b);

wherein the processor executes the stored program to compress the data elements in the wide table using a dictionary structure linking a data element to a compressed representation and storing the compressed representation in the wide table.

2. The database of claim 1 wherein the wide table retains at least one copy of each row of each table of the relational database structure in a row of the wide database structure.

3. The database of claim 2 wherein multiple tables are related by foreign keys referencing primary keys of other tables and wherein the outer join splits foreign keys of multiple tables of the relational database structure that have a same foreign key.

4. The database of claim 3 wherein multiple tables are related by primary keys referencing foreign keys and wherein the outer join eliminates the foreign keys.

5. The database of claim 3 wherein step (d) processes the wide query without join operations.

6. The database of claim 1 wherein the processor further executes the program to store the wide table using a columnar store format and wherein step (d) applies the wide query only to selected columns of the wide database structure referenced by the wide query.

7. The database of claim 1 wherein the processor further executes the program to store the wide table in solid state memory prior to step (d) without updating the wide table until a conclusion of step (d).

8. The database of claim 1 wherein the processor further executes the program to combine the data elements of the multiple tables to also provide at least one subset wide table having fewer columns than the wide table and including the step of testing the query to select the subset wide table for step (d) for at least some queries.

9. The database of claim 1 wherein step (c) tests the query to see if it can be answered with the wide table and if not applies the query to the relational database structure for at least some queries.

10. The database of claim 1 wherein step (d) reads data from the wide database structure in a packed format for parallel processing.

11. A method of executing a database query using an electronic computer in communication with a data storage system and a high-speed memory having faster access speed than the data storage system, the data storage system holding a database having a relational database structure of multiple tables having data elements organized in logical columns related to attributes and logical rows linking the data elements of different attributes, the tables related by key values; the method executing a program stored in non-transitory medium on the electronic computer to:

(a) combine the data elements of the multiple tables using an outer join to provide a wide database structure sized to store in high speed memory and having a wide table being a single logical table of rows and columns;

(b) store the wide database structure in high speed memory;

(c) after steps (a)-(b), receive a query for the relational database structure and convert it to a wide query for application to the wide table;

(d) apply the wide query to the wide table as stored in high speed memory to select rows of the wide table according to the wide query using only data contained in the wide table for the selection;

(e) output results from of the wide query applied to the wide database structure based on the selected rows; and (f) repeat steps (c)-(d) for the wide database structure of steps (a)-(b);

wherein compressing a size of the data elements in the wide table using a dictionary structure linking a data element to a compressed representation and storing the compressed representation in the wide table.

12. The method of claim 11 wherein multiple tables are related by foreign keys referencing primary keys of other tables and wherein the outer join splits foreign keys of multiple tables of the relational database structure have the same foreign key.

13. The method of claim 11 wherein the wide database structure retains at least one copy of each row of each table of the relational database structure in a row of the wide database structure.

14. The method of claim 11 wherein multiple tables are related by primary keys referencing foreign keys and wherein the outer join eliminates the foreign keys.

15. The method of claim 11 wherein step (d) processes the wide query without join operations.

16. The method of claim 11 further including the step of storing the wide table using a columnar store format and wherein step (d) applies the wide query only to selected columns of the wide database structure referenced by the wide query.

17. The method of claim 11 further including the step of storing the wide table in solid state memory prior to step (d) without updating the wide table until a conclusion of step (d).

* * * * *